(12) United States Patent
Gohain et al.

(10) Patent No.: US 11,940,874 B2
(45) Date of Patent: Mar. 26, 2024

(54) QUEUE MANAGEMENT FOR A MEMORY SYSTEM

(71) Applicant: Micron Technology, Inc., Boise, ID (US)

(72) Inventors: Nitul Gohain, Bangalore (IN); Jonathan S. Parry, Boise, ID (US); Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 21 days.

(21) Appl. No.: 17/883,051

(22) Filed: Aug. 8, 2022

(65) Prior Publication Data

US 2024/0045762 A1 Feb. 8, 2024

(51) Int. Cl.
*G06F 11/10* (2006.01)
*G06F 3/06* (2006.01)
*G06F 11/07* (2006.01)

(52) U.S. Cl.
CPC ........ *G06F 11/1068* (2013.01); *G06F 3/0619* (2013.01); *G06F 3/0659* (2013.01); *G06F 3/0679* (2013.01); *G06F 11/0772* (2013.01)

(58) Field of Classification Search
None
See application file for complete search history.

(56) References Cited

U.S. PATENT DOCUMENTS

| | | | | |
|---|---|---|---|---|
| 11,204,829 | B2* | 12/2021 | Fu | G06F 3/0604 |
| 2017/0269991 | A1* | 9/2017 | Bazarsky | G06F 3/064 |
| 2018/0165150 | A1* | 6/2018 | Fainzilber | G06F 11/1016 |
| 2022/0035699 | A1* | 2/2022 | Singhai | H03M 13/356 |
| 2023/0052044 | A1* | 2/2023 | He | G06F 11/0772 |
| 2023/0110377 | A1* | 4/2023 | Huo | G06F 9/4401 |
| | | | | 711/154 |

OTHER PUBLICATIONS

S.-L. Gong, J. Kim, S. Lym, M. Sullivan, H. David and M. Erez, "DUO: Exposing On-Chip Redundancy to Rank-Level ECC for High Reliability," 2018 IEEE International Symposium on High Performance Computer Architecture (HPCA), Vienna, Austria, 2018, pp. 683-695, doi: 10.1109/HPCA.2018.00064. (Year: 2018).*

* cited by examiner

*Primary Examiner* — Daniel F. McMahon
(74) *Attorney, Agent, or Firm* — Holland & Hart LLP

(57) ABSTRACT

Methods, systems, and devices for queue management for a memory system are described. The memory system may include a first decoder associated with a first error control capability and a second decoder associated with a second error control capability. The memory system may receive a command and identify an expected latency for performing an error control operation on the command. The memory system may determine whether to assign the command to a first queue associated with the first decoder or a second queue associated with the second decoder based at least in part on the expected latency for processing the command using the first decoder. Upon assigning the command to a decoder, the command may be processed by the first queue or the second queue.

25 Claims, 6 Drawing Sheets

QUEUE MANAGEMENT FOR A MEMORY SYSTEM

FIELD OF TECHNOLOGY

The following relates to one or more systems for memory, including queue management for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may implement a memory architecture (e.g., Universal Flash Storage (UFS) architecture) for receiving and processing commands (e.g., access commands) from a host system. The memory system may receive the commands from the host system and may assign the commands to queues (e.g., queues of one or more decoders) for processing in the sequential order provided by the host system (e.g., on a first-in first-out (FIFO) manner). In some cases, one or more hardware components of the memory system may assign the commands to the queues, and each queue may be associated with a respective latency for processing commands. Accordingly, such memory systems do not have the capability to prioritize or deprioritize decoding of commands based on expected latency, desired error correction capabilities, or other metrics. Thus, a memory system configured to selectively assign commands to decoders (e.g., queues of decoders) in such a manner may be desirable.

A memory system configured to selectively assign commands to one or more decoders based on expected latency, desired error correction capabilities, or other similar metrics is described herein. In some cases, the memory system may include one or more decoders that are associated with different error control capabilities, such that a first decoder (e.g., a decoder having a relatively high latency and a relatively high error correction capability) associated with a first queue may have a relatively high error control capability, and a second decoder (e.g., a decoder having a relatively low latency and a relatively low error correction capability) associated with a second queue may have a relatively low error control capability. In such cases, the firmware of the memory system may determine characteristics of the data associated with a received command and may assign the command to a respective queue based on the error control capabilities of the corresponding decoder or a priority for decoding the data. For example, the firmware may determine to assign a command to the first queue or the second queue based on a type of data included in the command, an expected latency associated with processing the command, the error control capabilities of the decoders, or an indication provided from the host system specifying the priority for decoding the command, or any combination thereof. By assigning commands based on such metrics or characteristics, the quality of service (QoS) of the memory system may be improved, its throughput may be increased, and timeouts associated with processing commands may be mitigated or prevented.

Figure 1:
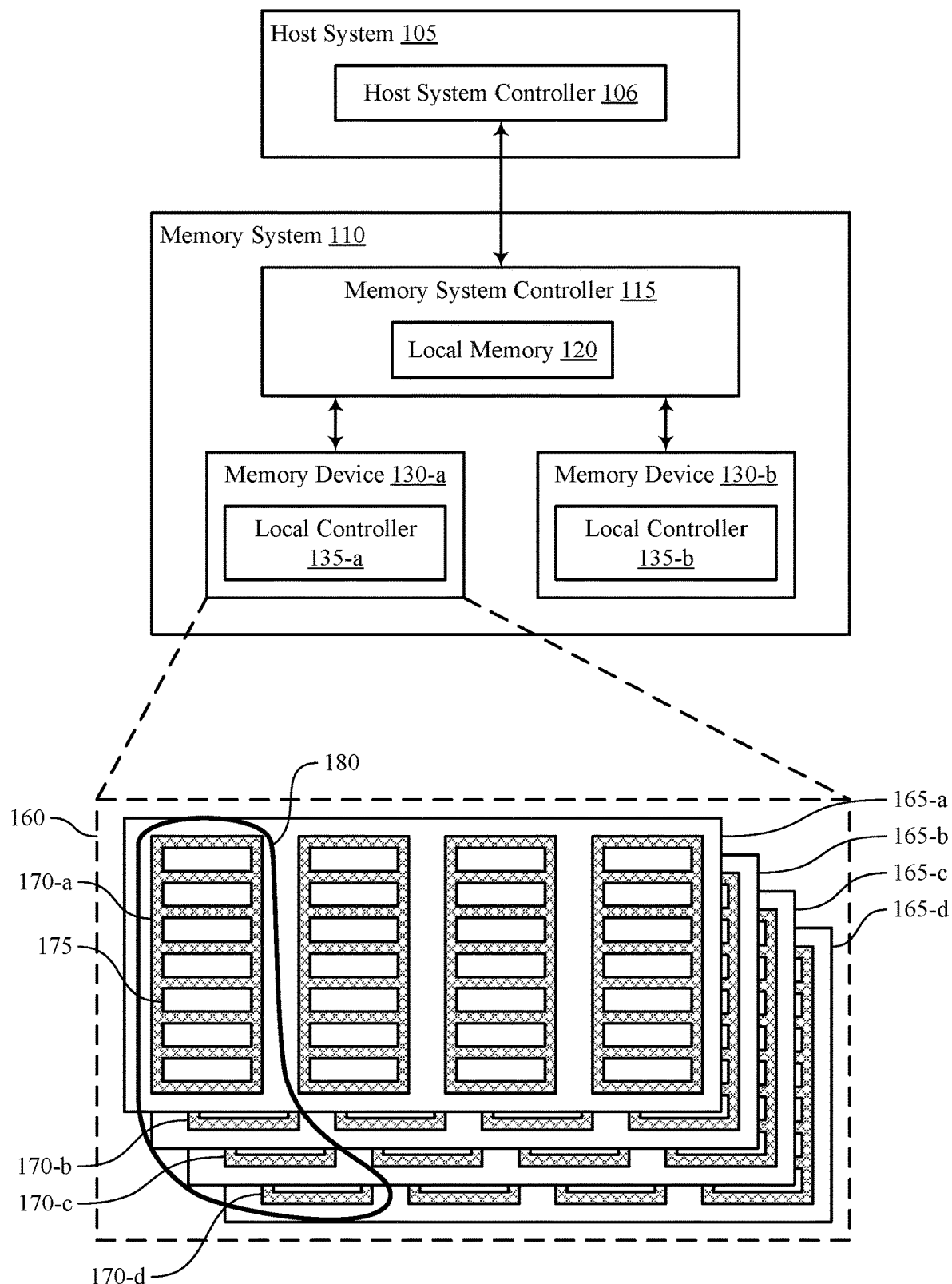
FIG. 1 illustrates an example of a system that supports queue management for a memory system in accordance with examples as disclosed herein.
Figure 2:
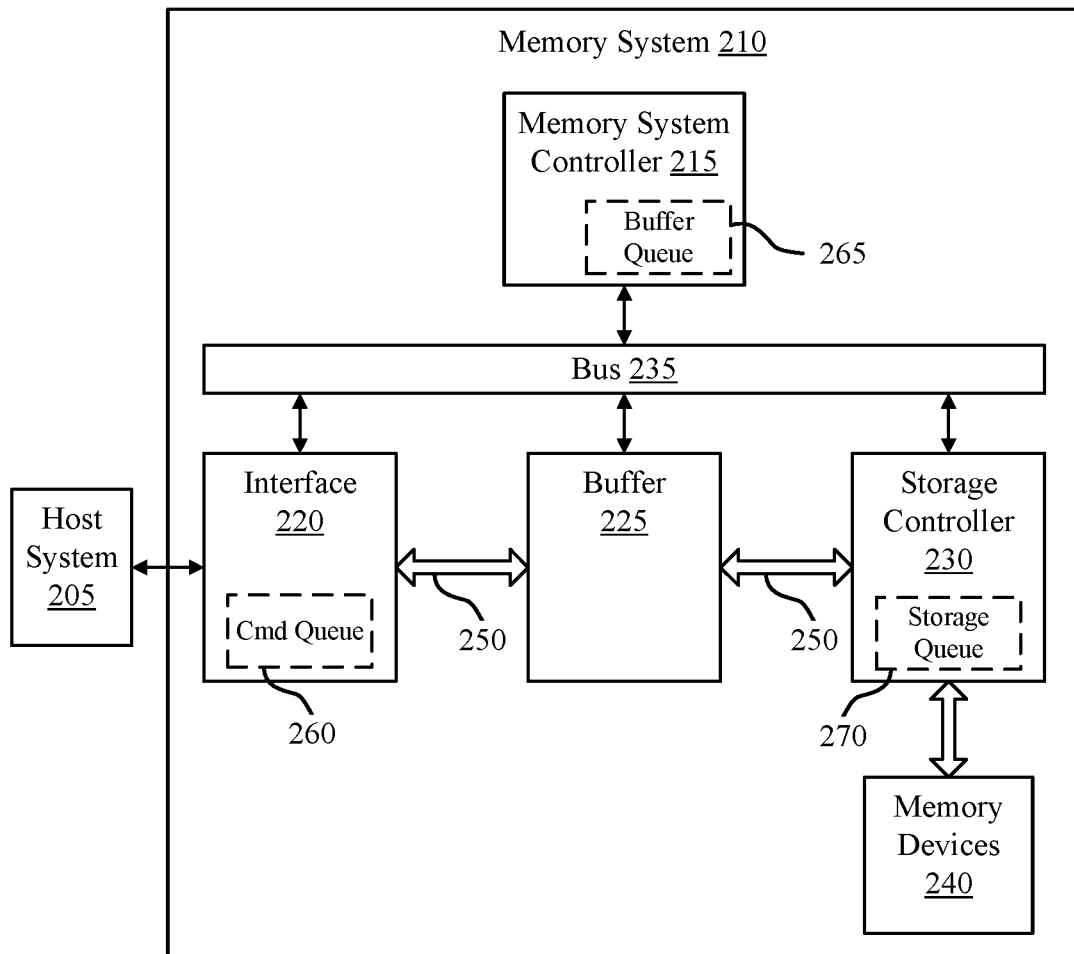
FIG. 2 illustrates an example of a system that supports queue management for a memory system in accordance with examples as disclosed herein.

Features of the disclosure are initially described in the context of systems with reference to FIGS. 1 and 2. Features of the disclosure are described in the context of a memory system and a process flow diagram with reference to FIGS. 3 and 4, respectively. These and other features of the disclosure are further illustrated by and described in the context of an apparatus diagram and flowchart that relate to queue management for a memory system with reference to FIGS. 5 and 6.

FIG. 1 illustrates an example of a system 100 that supports queue management for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support queue management for a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may include a decoding block (e.g., a low-density parity-check (LDPC) decoder) coupled with the memory system controller 115. The decoding block may include a first decoder (e.g., a decoder having a relatively high latency and a relatively high error correction capability) associated with a first queue and a second decoder (e.g., a decoder having a relatively low latency and a relatively low error correction capability) associated with a second queue. In some cases, the first queue and the second queue may be associated with different priority levels, such that relatively higher priority data (e.g., data that is desirable to decode relatively quickly) may be assigned to the second queue and relatively lower priority data (e.g., data that is less desirable to decode relatively quickly) may be assigned to the first queue.

In some examples, the memory system 110 may receive a command (e.g., at the memory system controller 115) from the host system 105. The memory system controller 115 may assign the command to the first queue or the second queue to be processed (e.g., decoded) by the first decoder or the second decoder, respectively. In some cases, the memory system controller 115 may identify characteristics of the data associated with the command and assign the command to the first queue or the second queue based on the characteristics. In some cases, the decoders may be associated with different error control capabilities, such that the first decoder may have a relatively higher error control capability but may take relatively longer to process associated commands (e.g., the first decoder may be associated with a relatively high latency) and the second decoder may have a relatively low error control capability but may process associated commands relatively quickly (e.g., the second decoder may be associated with a relatively low latency).

In such cases, firmware of the memory system 110 may assign a command associated with higher priority (e.g., error control constraints and expected latency) to the first queue and a command associated with lower priority to the second queue. In some examples, the firmware may determine to assign a command to the first queue or the second queue based on a type of data included in the command, an expected latency associated with processing the command, the error control capabilities of the decoders, or an indication provided from the host system 105 specifying the priority for decoding the command. In the case of a write operation, after the command is processed by the decoder of the respective queue, the data associated with the command may be written to a memory device 130. By assigning commands based on such metrics or characteristics, the quality of service (QoS) of the memory system 110 may be improved, its throughput may be increased, and timeouts associated with processing commands may be mitigated or prevented.

FIG. 2 illustrates an example of a system 200 that supports queue management for a memory system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, in response to the data transfer to the buffer 225 being completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may include a decoding block (e.g., a low-density parity-check (LDPC) decoder) coupled with the memory system controller 215. The decoding block may include a first decoder (e.g., a decoder having a relatively high latency and a relatively high error correction capability) associated with a first queue and a second decoder (e.g., a decoder having a relatively low latency and a relatively low error correction capability) associated with a second queue. In some cases, the first queue and the second queue may be associated with different priority levels, such that relatively higher priority data (e.g., data that is desirable to decode relatively quickly) may be assigned to the first queue and relatively lower priority data (e.g., data that is less desirable to decode relatively quickly) may be assigned to the second queue.

In some examples, the memory system 210 may receive a command (e.g., at the memory system controller 215) from the host system 205. The memory system controller 215 may assign the command to the first queue or the second queue to be processed (e.g., decoded) by the first decoder or the second decoder, respectively. In some cases, the memory system controller 215 may identify characteristics of the data associated with the command and assign the command to the first queue or the second queue based on the characteristics. In some cases, the decoders may be associated with different error control capabilities, such that the first decoder may have a relatively higher error control capability but may take relatively longer to process associated commands (e.g., the first decoder may be associated with a relatively high latency) and the second decoder may have a relatively low error control capability but may process associated commands relatively quickly (e.g., the second decoder may be associated with a relatively low latency).

In such cases, firmware of the memory system 210 may assign a command associated with higher priority (e.g., error control constraints and expected latency) to the first queue and a command associated with lower priority to the second queue. In some examples, the firmware may determine to assign a command to the first queue or the second queue based on a type of data included in the command, an expected latency associated with processing the command, the error control capabilities of the decoders, or an indication provided from the host system 205 specifying the priority for decoding the command. In the case of a write operation, after the command is processed by the decoder of the respective queue, the data associated with the command may be written to a memory device 240. By assigning commands based on such metrics or characteristics, the quality of service (QoS) of the memory system 210 may be improved, its throughput may be increased, and timeouts associated with processing commands may be mitigated or prevented.

Figure 3:
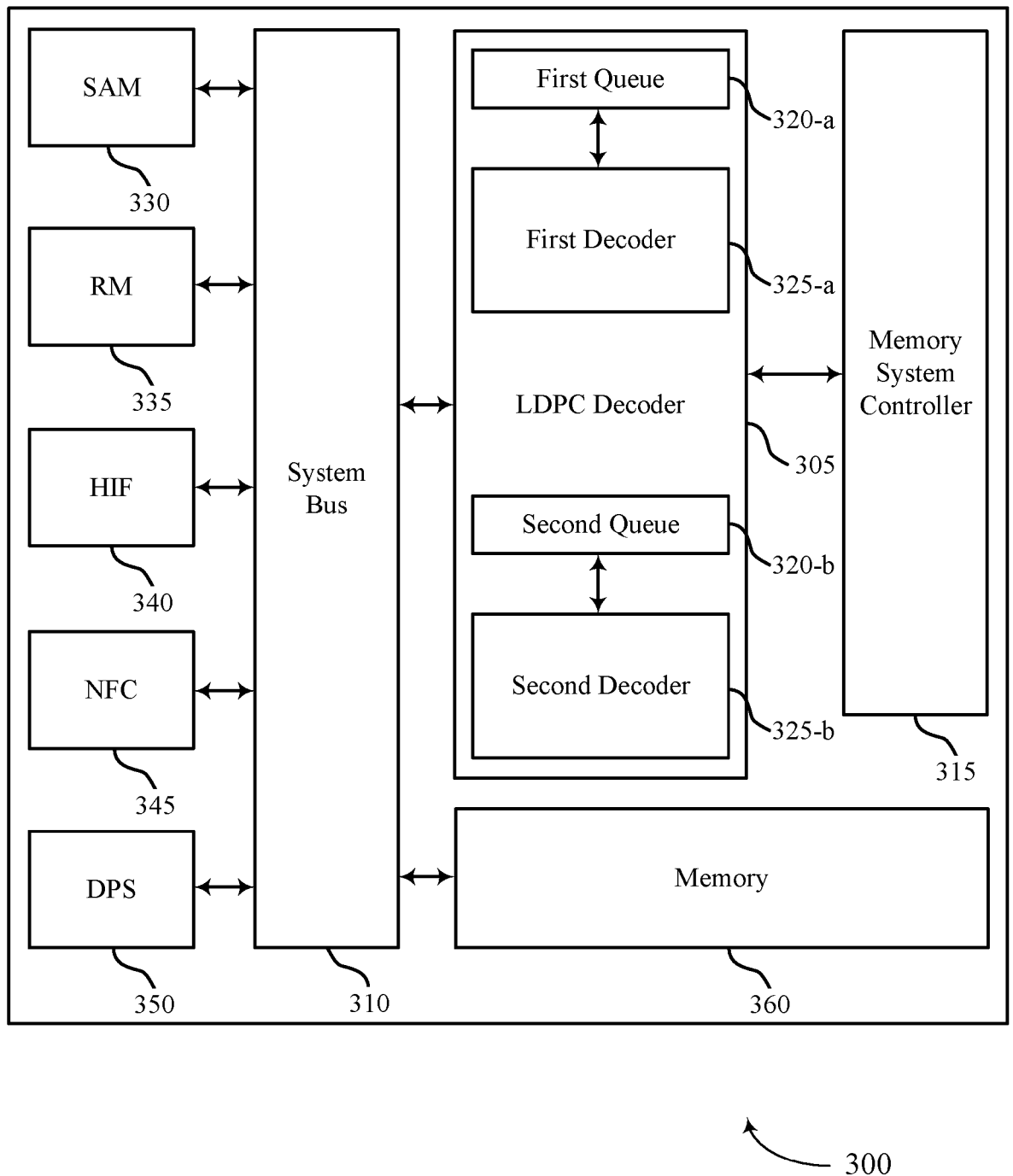
FIG. 3 illustrates an example of a memory system that supports queue management for a memory system in accordance with examples as disclosed herein.

FIG. 3 illustrates an example of a memory system 300 that supports queue management in accordance with examples as disclosed herein. The memory system 300 may be an example of a system 100 or a system 200 as described with reference to FIG. 1 and FIG. 2, respectively. The memory system 300 may also implement aspects of the system 100 or the system 200 as described with reference to FIG. 1 and FIG. 2, respectively. For example, the memory system 300 may be an example of the memory system 110 or the memory system 210. Additionally, the memory system controller 315 may be an example of the memory system controller 115 or the memory system controller 215. Aspects of the memory system 300 may be omitted from FIG. 3 for illustrative clarity. In some cases, the memory system 300 may assign commands from a host system (not shown) to queues 320 of the memory system 300 based on the error correction capability of decoders 325 associated with the queues 320 or characteristics of the data associated with the command.

The memory system 300 may include a memory system controller 315 configured to process commands (e.g., read or write commands) received from a host system. The memory system controller 315 may be configured to assign the commands to components of the memory system 300. The memory system controller 315 may be a computer processing unit (CPU) that includes firmware configured to assign received commands to one or more queues of a low-density parity-check (LDPC) decoder 305 (e.g., coupled with the memory system controller 315) as described herein.

The memory system 300 may include the LDPC decoder 305 configured to receive the commands assigned from the memory system controller 315. The LDPC decoder 305 may include a first queue 320-a and a second queue 320-b for storing (e.g., temporarily storing) the commands assigned to the LDPC decoder 305. The LDPC decoder 305 may include a first decoder 325-a associated with the first queue 320-a. The first decoder 325-a may process (e.g., decode) the commands assigned to the first queue 320-a according to a first error control capability. Additionally, the LDPC decoder 305 may include a second decoder 325-b, which may process the commands assigned to the second queue 320-b according to a second (e.g., a different) error control capability.

As described herein, the first decoder 325-a may be associated with a first error control capability (e.g., a first error detection and correction capability) and the second decoder 325-b may be associated with a second error control capability (e.g., a second error detection and correction capability). For example, each decoder 325 may be associated with a linear error correcting code that may detect and correct bit-errors in the data.

The first decoder 325-a may be configured to correct a relatively higher quantity of errors than the second decoder 325-b. That is, the first decoder 325-a may be utilized to decode data where error detection is a relatively high priority and the latency for decoding the data is a relatively lower priority. In another example, the second decoder 325-b may correct a relatively lower quantity of errors than the first decoder 325-a. However, the second decoder 325-b may detect or correct errors or both with a relatively high throughput. That is, the second decoder 325-b may be utilized to decode data where error detection is a relatively lower priority and the latency for decoding the data is a relatively high priority. In some examples, error control capability may describe the ability of a decoder 325 to detect and, in some instances, correct raw bit errors occurring as a result of a relatively high quantity of program/erase cycles (PECs) performed on the memory system 300. For example, a raw bit error rate (RBER) may increase with a greater quantity of PECs. In some implementations, as a quantity of PECs on a memory block increases, the memory block may be more susceptible to raw bit errors that are detectable and correctable by the decoders 325.

The LDPC decoder 305 may be coupled with a system bus 310. The system bus 310 may be a pathway (e.g., a channel) connecting various components of the memory system 300. For example, the system bus 310 may be coupled with a system area manager (SAM) 330, a resource manager (RM) 335, a host interface (HIF) 340, a NAND flash controller (NFC) 345 (e.g., a memory system controller 115 or a memory system controller 215 as described with reference to FIGS. 1 and 2, respectively), and a dynamic partitioning scheduler (DPS) 350. The system bus 310 may also be coupled with memory 360. The memory 360 have a plurality of memory arrays, request queues, status queues, command memory arrays, address lists, and user-data length lists for storing data. In some cases, the memory 360 may be associated with die-to-die and block-to-block variation, such that the RBER and the retention capability of blocks in the memory 360 may vary. In some cases, the memory 360 may include one or more blocks that degrade relatively quickly if exposed to external conditions such as high temperature, but may otherwise function normally. For example, a block may have a high quantity of PECs or other source of physical degradation that may lead to greater errors in storing data. In such cases, the memory system controller 315 may assign the data to the first queue 320-a based on a desire for increased error correction capabilities.

In some cases, the memory system 300 may receive commands from a host system (not shown). For example, the memory system 300 may receive read commands or write commands from the host system. The command mays be received at an interface of the memory system 300 and may be transmitted to the memory system controller 315 (e.g., via the system bus 310). Subsequently, the commands may be assigned by the memory system controller 315 and processed by the queue 320 to which they are assigned. In some examples, processing the write command may include decoding the write command and storing the data indicated in the write command to the memory 360 to complete the command. In some other examples, processing the read command may include decoding the read command, identifying data in the memory 360 associated with the read command, and transferring the identified data to the host system to complete the command.

In some cases, the memory system controller 315 may receive the commands (e.g., write or read commands) from the host system and assign the commands to the first queue 320-a or the second queue 320-b based on an expected latency (e.g., the amount of time expected to process the respective command) of processing the commands. In some examples, the commands may contain different types of data, such that the expected latency for processing the commands may be based on the types of data. For example, a command with an expected latency that is relatively high may contain a first type of data (e.g., user data), such as a set of codewords (e.g., associated with high decoding priority). In some other examples, a command with an expected latency that is relatively low may contain a second type of data, such as system logs, debug logs, firmware logs, L2P update information, or health information, among other examples, where a high RBER may be acceptable for the data.

In some cases, the host system may include an indication of a priority level (e.g., decoding priority) for processing the command in the command itself. For example, a command may include one or more bits, in one or more fields of the command, that may specify the priority level (e.g., high priority or low priority) for processing the command. In some implementations, the one or more bits may indicate that the command has a priority level (e.g., a high priority or a low priority) and the memory system controller 315 may assign the command to the first queue 320-a or the second queue 320-b based on the priority level. Commands may be associated with any quantity of priority levels. In some examples, commands may be categorized into two priority levels, high priority and low priority. In other examples, commands may be categorized into three or more priority levels, including three, four, five, six, seven, eight, or more priority levels.

In some implementations, the one or more bits may indicate an expected priority value and the memory system controller 315 may determine if the expected priority value satisfies a threshold to be assigned to the first queue 320-a or the second queue 320-b accordingly. For example, the command may contain a bit indicating that the command is a high priority command relative to other comments, and the memory system controller 315 may assign the command to the first queue 320-a due to the first decoder 325-a having a relatively higher error control capability. In other examples, the command may contain a bit indicating that the command is a low priority command relative to other comments, and the memory system controller 315 may assign the command to the second queue 320-b due to the second decoder 325-b having a relatively lower latency.

By way of example, the memory system 300 may receive a command from the host system at the memory system controller 315. In some cases, the memory system controller 315 may identify the type of data indicated in the command. For example, the memory system controller 315 may identify the data indicated in the command as the first type of data or the second type of data. In some cases, the memory system controller 315 may identify the priority level (e.g., a high priority or a low priority) indicated by host system in the command. The memory system controller 315 may determine the expected latency of processing the command using one of the decoders based on the type of data or the indication of the priority level for processing the command or both. For example, the expected latency may be greater for a command containing the first type of data, or a high priority indication of the command, or both. In another example, the expected latency may be lower for a command containing the second type of data, or a low priority indication of the command, or both. The memory system controller 315 may assign the command to the first queue 320-a or the second queue 320-b based on the expected latency of processing the command by the decoders 325.

In some cases, the memory system controller 315 may assign the command to the first queue 320-a and the first decoder 325-a may process the command (e.g., by decoding the command). In some other cases, the memory system controller 315 may assign the command to the second queue 320-b, and the command may not be processed by the second decoder 325-b for a duration that exceeds a threshold (e.g., a timeout may occur). Such a timeout may cause the latency for performing commands to increase and may reduce the performance of the memory system (e.g., the memory system may take longer to perform host-initiated commands and may reduce a host system's ability to submit additional commands to the memory system). In such cases, the memory system controller 315 may assign (e.g., reassign) the command to the first queue 320-a to be processed by the first decoder 325-a.

In some examples, the second decoder 325-b may attempt to process the command, and the second decoder 325-b may successfully process the command or experience a timeout while attempting to process the command. In examples where the second decoder 325-b experiences a timeout, the memory system controller 315 may set a threshold quantity of iterations that the second decoder 325-b may attempt to process the command. In some implementations, the memory system controller 315 may compare the quantity of iterations performed to the threshold quantity of iterations, such that the second decoder 325-b may refrain from processing the command if the threshold quantity of iterations is satisfied.

In such cases where the second decoder 325-b experiences a timeout, the memory system controller 315 may reassign the command to the first queue 320-a to be processed by the first decoder 325-a. In some examples, the firmware of the memory system controller 315 (or the LDPC decoder 305) may transfer the command to the first queue 320-a in response to a timeout or the quantity of iterations satisfying the threshold or both. In some implementations, the second decoder 325-b may transmit a message to the first decoder 325-a indicating the reassignment of the command. In other examples, the memory system controller 315 may reassign the command in response to a high priority indication, a high temperature indication, or a power constraint at the memory system 300. By assigning commands based on such metrics or characteristics, the quality of service (QoS) of the memory system 300 may be improved, its throughput may be increased, and timeouts associated with processing commands may be mitigated or prevented.

Figure 4:
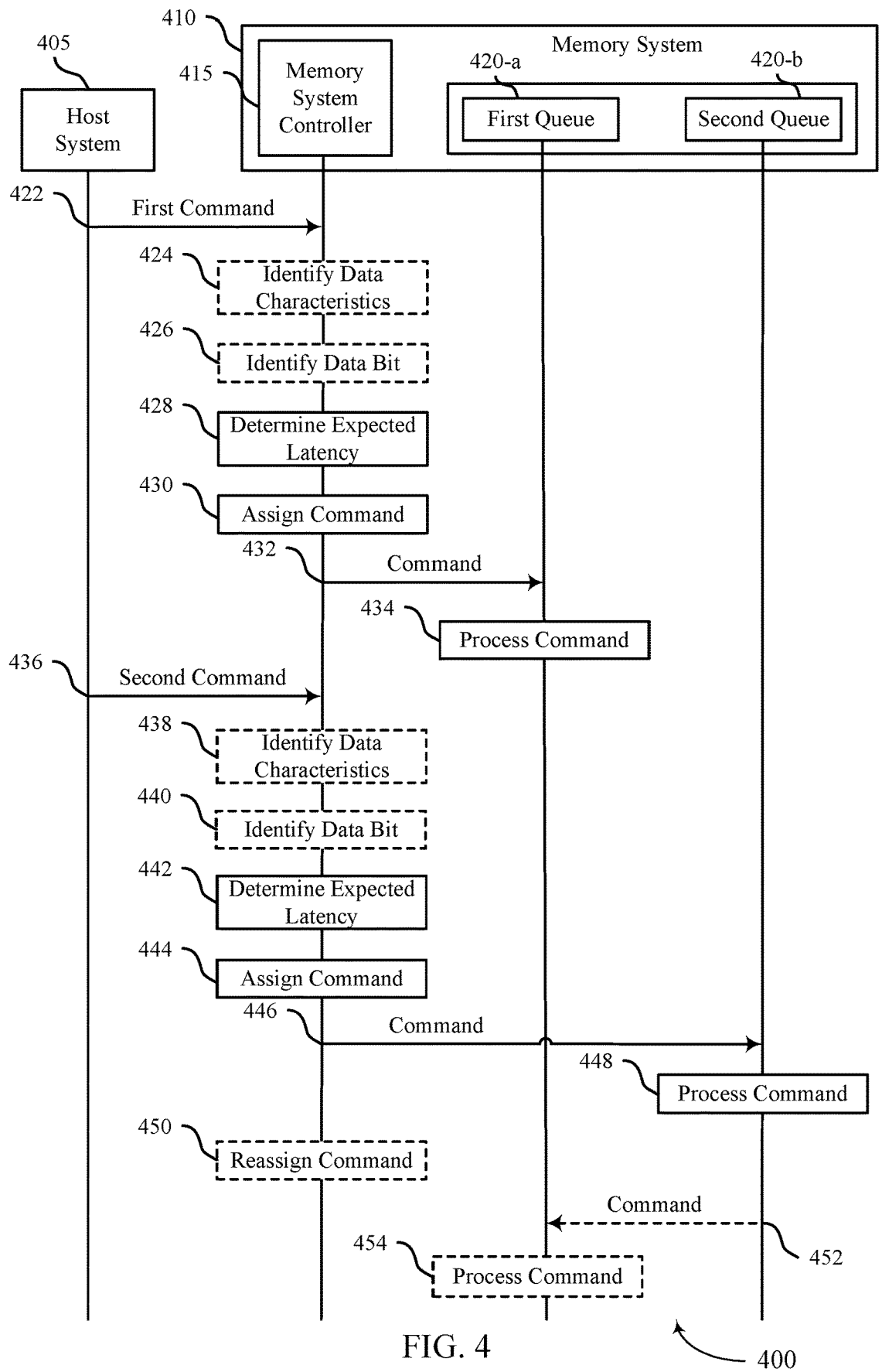
FIG. 4 illustrates an example of a process flow diagram that supports queue management for a memory system in accordance with examples as disclosed herein.

FIG. 4 illustrates an example of a process flow diagram 400 that supports queue management in accordance with examples as disclosed herein. The process flow diagram 400 may be an example for implementing aspects or operations of memory system 300 as described with reference to FIG. 3. Additionally, or alternatively, the process flow diagram may be an example for implementing aspects or operations of systems 100 and 200 as described with reference to FIGS. 1 and 2, respectively. For example, the process flow diagram 400 may depict operations at a host system 405 and a memory system 410, which may be examples of host system 105 and 205 and memory system 110 and 210, as described with reference to FIGS. 1 and 2, respectively. By assigning commands based on such metrics or characteristics, the QoS of the memory system 410 may be improved, its throughput may be increased, and timeouts associated with processing commands may be mitigated or prevented.

In the following description of the process flow diagram 400, the operations may be performed in different orders or at different times, and some operations may be left out or added to the process flow diagram 400. In some examples, operation described as being included or performed at one component or system may additionally or alternatively be performed at another component or system. The process flow diagram 400 may include components not illustrated for clarity.

The process flow diagram 400 may include a host system 405 configured to transmit commands (e.g., read or write commands) to the memory system 410. The memory system 410 may include a memory system controller 415, which may be an example of the memory system controller 315 as described with reference to FIG. 3. The memory system controller 415 may include firmware for controlling the operations at the memory system 410. The memory system may also include a low-density parity-check (LDPC) decoder which may include a first queue 420-*a* and a second queue 420-*b*, which may be examples of the first queue 320-*a* and the second queue 320-*b* as described with reference to FIG. 3. The memory system may include a first decoder (not shown) associated with the first queue 420-*a* and a second decoder (not shown) associated with the second queue 420-*b*, where the first decoder and the second decoder may be examples of the first decoder 325-*a* and the second decoder 325-*b* as described with reference to FIG. 3.

At 422, the host system may transmit a first command to the memory system 410. The memory system 410 may receive the first command at the memory system controller 415. The first command may be an example of a read command or a write command as described herein. For example, the first command may be a write command that includes first data.

At 424, the memory system controller 415 may identify one or more characteristics of the first data. For example, the memory system controller 415 may identify the type of data indicated in the first command as a first type of data or a second type of data. As described herein, a first type of data may include data using a relatively high error control capability (e.g., user data), such as a set of codewords, and a second type of data may include data using a relatively low error control capability, such as system logs, debug logs, firmware logs, L2P update information, or health information, among other examples, where a quantity of errors may be acceptable for the data.

At 426, the memory system controller 415 may identify a value of at least one bit of the first data indicated in the first command received from the host system 405. The at least one bit of the first data may be an indication from the host system 405 of a priority level (e.g., a decoding priority) for processing the first command. The at least one bit of the first data may be included in one or more reserved fields of the data and may indicate the first data as relatively high priority data or relatively low priority data.

At 428, the memory system controller 415 may identify and determine an expected latency for performing an error control operation on the first data. The memory system controller 415 may determine the expected latency of performing the error control operation based on the type of data or the at least one bit indicating the priority level for processing the first command or both. For example, the expected latency may be greater for a command containing the first type of data, or a high priority indication of the command, or both. In another example, the expected latency may be lower for a command containing the second type of data or a low priority indication of the command or both.

At 430, the memory system controller 415 may determine whether to assign the first command to the first queue 420-*a* or the second queue 420-*b*. The memory system controller 415 may assign the command to the first queue 420-*a* or the second queue 420-*b* based on the expected latency of processing the command by the first decoder or the second decoder, respectively. In some cases, the memory system controller 415 may assign the command to the first queue 420-*a* or the second queue 420-*b* based on the error control capabilities of the first decoder and the second decoder. The memory system controller 415 may determine the expected latency for processing the command and assign the command to the first queue 420-*a* or the second queue 420-*b* according to the error control capabilities of the first decoder and the second decoder. For example, the memory system controller 415 may identify a relatively high expected latency for processing the command and assign the command to the first queue 420-*a* due to the first decoder being associated with the first error control capability.

In another example, the memory system controller 415 may identify a relatively low expected latency for processing the command and may assign the command to the second queue 420-*b* due to the second decoder being associated with the second error control capability. In some implementations, the memory system controller 415 may determine to assign the first command to the first queue 420-*a* based on the type of data of the first data or the priority level indicated in the first data or both. In some implementations, the memory system controller 415 may determine to assign the first command to the first queue 420-*a* based on determining the expected latency for performing the error control operation satisfies a threshold.

At 432, the memory system controller 415 may transfer the first command to the first queue 420-*a* based on the first command being assigned to the first queue 420-*a* by the memory system controller 415.

At 434, the first decoder may process the first command assigned to the first queue 420-*a*. Processing the first command may include decoding the first command and determining to write (e.g., for a write command) the first data to memory of the memory system 410 or determining to read (e.g., for a read command) the first data from the memory of the memory system 410.

At 436, the host system may transmit a second command to the memory system 410. The memory system 410 may receive the second command at the memory system controller 415. The second command may be an example of a read command or a write command.

At 438, the memory system controller 415 may identify characteristics of the second data. For example, the memory system controller 415 may identify the type of data indicated in the second command as the first type of data or the second type of data.

At 440, the memory system controller 415 may identify a value of at least one bit of the second data included in the second command from the host system 405. The at least one bit of the second data may be an indication from the host system 405 of a priority level (e.g., decoding priority) for processing the second command. The at least one bit of the second data may be included in one or more reserved fields of the data and may indicate the second data as relatively high priority data or relatively low priority data.

At 442, the memory system controller 415 may identify and determine an expected latency for performing an error control operation on the second data. The memory system controller 415 may determine the expected latency for performing the error control operation based on the type of data or the at least one bit indicating the priority level for processing the second command or both.

At 444, the memory system controller 415 may determine whether to assign the first command to the first queue 420-a or the second queue 420-b. The memory system controller 415 may assign the command to the first queue 420-a or the second queue 420-b based on the expected latency of processing the command by the first decoder or the second decoder, respectively. In some cases, the memory system controller 415 may assign the command to the first queue 420-a or the second queue 420-b based on the error control capabilities of the first decoder and the second decoder. The memory system controller 415 may determine the expected latency for processing the command and assign the command to the first queue 420-a or the second queue 420-b according to the error control capabilities of the first decoder and the second decoder. For example, the memory system controller 415 may identify a relatively high expected latency for processing the command and assign the command to the first queue 420-a due to the first decoder being associated with the first error control capability.

At 446, the memory system controller 415 may transfer the second command to the second queue 420-b based on the second command being assigned to the second queue 420-b by the memory system controller 415.

At 448, the second decoder may attempt to process the second command assigned to the second queue 420-b. Processing the first command may include decoding the second command and determining to write (e.g., for a write command) the second data to the memory of the memory system 410 or determining to read (e.g., for a read command) the second data from the memory of the memory system 410. In some cases, the memory system controller 415 may determine after a duration that the second command was unsuccessfully processed by the second decoder. For example, the second decoder may experience a timeout due to unsuccessfully processing the command a threshold quantity of times or due to unsuccessfully processing the command for a threshold duration. Upon the occurrence of the timeout, the memory system controller 415 may instruct the second decoder to refrain from processing the second command and the second command may be transferred to the first queue 420-a.

At 450, the memory system controller 415 may reassign the second command to the first queue 420-a to be processed by the corresponding first decoder. The memory system controller 415 may reassign the second command to the first queue 420-a in response to the second decoder being unsuccessful in processing the second command. In some implementations, the second command may include a field in the second data instructing the memory system controller 415 to reassign the second command to the first decoder after unsuccessfully processing the second command.

At 452, the memory system controller 415 may transfer the second command from the second queue 420-b to the first queue 420-a, based on the second command being reassigned to the first queue 420-a by the memory system controller 415.

At 454, the first decoder may attempt to process the second command reassigned to the first queue 420-a. Processing the first command may include decoding the second command and determining to write (e.g., for a write command) the second data to the memory of the memory system 410 or determining to read (e.g., for a read command) the second data from the memory of the memory system 410. By assigning commands based on such metrics or characteristics, the quality of service (QoS) of the memory system 410 may be improved, its throughput may be increased, and timeouts associated with processing commands may be mitigated or prevented.

Figure 5:
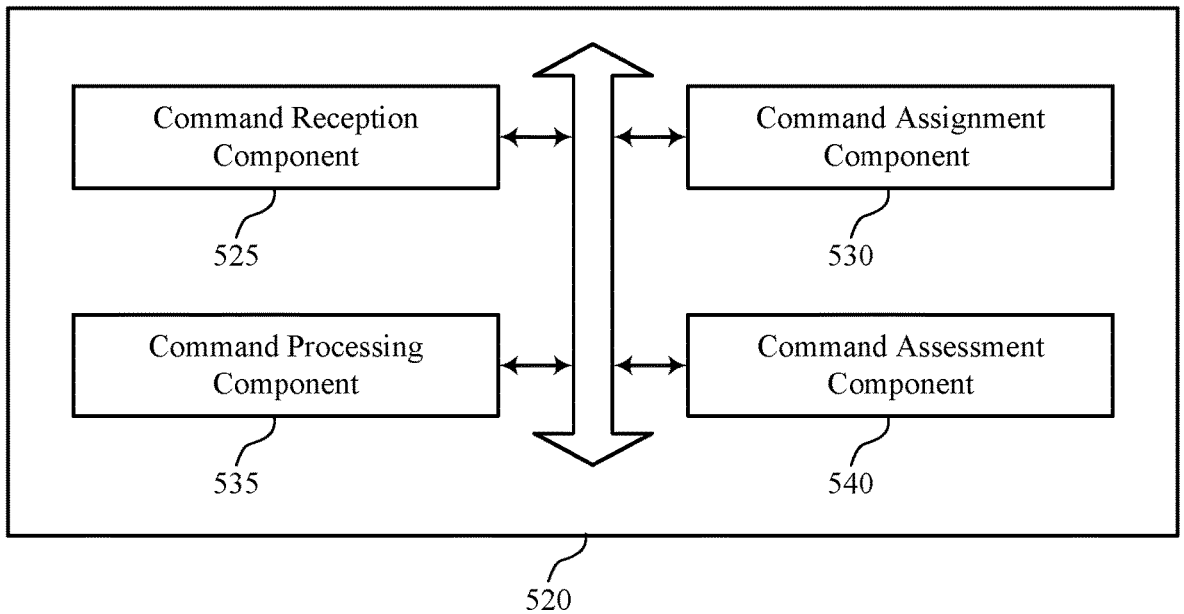
FIG. 5 shows a block diagram of a memory system that supports queue management for a memory system in accordance with examples as disclosed herein.

FIG. 5 shows a block diagram 500 of a memory system 520 that supports queue management for a memory system in accordance with examples as disclosed herein. The memory system 520 may be an example of aspects of a memory system as described with reference to FIGS. 1 through 4. The memory system 520, or various components thereof, may be an example of means for performing various aspects of queue management for a memory system as described herein. For example, the memory system 520 may include a command reception component 525, a command assignment component 530, a command processing component 535, a command assessment component 540, or any combination thereof. Each of these components may communicate, directly or indirectly, with one another (e.g., via one or more buses).

The command reception component 525 may be configured as or otherwise support a means for receiving, at a memory system, a first command including first data, where the memory system includes a first decoder associated with a first error control capability and a second decoder associated with a second error control capability. The command assignment component 530 may be configured as or otherwise support a means for determining whether to assign the first command to a first queue associated with the first decoder or a second queue associated with the second decoder based at least in part on an expected latency for performing an error control operation on the first data using the first decoder. The command processing component 535 may be configured as or otherwise support a means for processing, by the first decoder, the first command according to the first error control capability based at least in part on assigning the first command to the first queue.

In some examples, the command assessment component 540 may be configured as or otherwise support a means for identifying the expected latency for performing the error control operation on the first data using the first decoder based at least in part on receiving the first command, where determining whether to assign the first command to the first queue or the second queue is based at least in part on identifying the expected latency.

In some examples, to support identifying the expected latency for performing the error control operation on the first data, the command assessment component 540 may be configured as or otherwise support a means for identifying a type of the first data, where determining whether to assign the first command to the first queue associated with the first decoder or the second queue associated with the second decoder is based at least in part on the type of the first data.

In some examples, the command assessment component 540 may be configured as or otherwise support a means for identifying a value of at least one bit of the first data indicated by a host device, where identifying the expected latency for performing the error control operation on the first data is based at least in part on identifying the value.

In some examples, the command reception component 525 may be configured as or otherwise support a means for receiving, at the memory system, a second command including second data, where the second command includes an indication of a priority level for processing the second command. In some examples, the command assignment component 530 may be configured as or otherwise support a means for assigning the second command to the first queue associated with the first decoder based at least in part on the indication of the priority level for processing the second command. In some examples, the command processing component 535 may be configured as or otherwise support a means for processing, by the first decoder, the second command according to the first error control capability based at least in part on assigning the second command to the first queue.

In some examples, the command assignment component 530 may be configured as or otherwise support a means for assigning the first command to the first queue associated with the first decoder based at least in part on the expected latency for performing the error control operation on the first data satisfying a first threshold value.

In some examples, the command assessment component 540 may be configured as or otherwise support a means for identifying a second expected latency for performing an error control operation on third data associated with a third command. In some examples, the command processing component 535 may be configured as or otherwise support a means for processing, by the second decoder, the third command according to the second error control capability based at least in part on the second expected latency for performing the error control operation on the third data associated with the third command.

In some examples, the command reception component 525 may be configured as or otherwise support a means for receiving, at the memory system, the third command including the third data, where identifying the second expected latency for performing the error control operation on the third data is based at least in part on receiving the third command. In some examples, the command assignment component 530 may be configured as or otherwise support a means for determining whether to assign the third command to the second queue associated with the second decoder based at least in part on identifying the second expected latency for performing the error control operation on the third data. In some examples, the command assignment component 530 may be configured as or otherwise support a means for assigning the third command to the second queue associated with the second decoder based at least in part on the second expected latency for performing the error control operation on the third data satisfying a second threshold value, where processing the third data is based at least in part on assigning the third command to the second queue.

In some examples, the command assessment component 540 may be configured as or otherwise support a means for identifying a third expected latency for performing an error control operation on fourth data associated with a fourth command. In some examples, the command processing component 535 may be configured as or otherwise support a means for attempting to process, by the second decoder for a duration, the fourth command according to the second error control capability based at least in part on the third expected latency for performing the error control operation on the fourth data associated with the fourth command.

In some examples, the command processing component 535 may be configured as or otherwise support a means for determining, after the duration, that the fourth command was unsuccessfully processed by the second decoder. In some examples, the command assignment component 530 may be configured as or otherwise support a means for transferring the fourth data to the first queue based at least in part on determining that the fourth command was unsuccessfully processed. In some examples, the command processing component 535 may be configured as or otherwise support a means for processing, by the first decoder, the fourth command according to the first error control capability based at least in part on transferring the fourth data to the first queue.

In some examples, the command processing component 535 may be configured as or otherwise support a means for determining, after the duration, that the fourth command was unsuccessfully processed. In some examples, the command processing component 535 may be configured as or otherwise support a means for refraining from processing the fourth command according to the second error control capability based at least in part on determining that the fourth command was unsuccessfully processed.

In some examples, the first error control capability of the first decoder includes a first quantity of errors that are detectable and a second quantity of errors that are correctable by the first decoder. In some examples, the second error control capability of the second decoder includes a third quantity of errors that are detectable and a fourth quantity of errors that are correctable by the second decoder. In some examples, the first quantity of errors being greater than the third quantity of errors.

Figure 6:
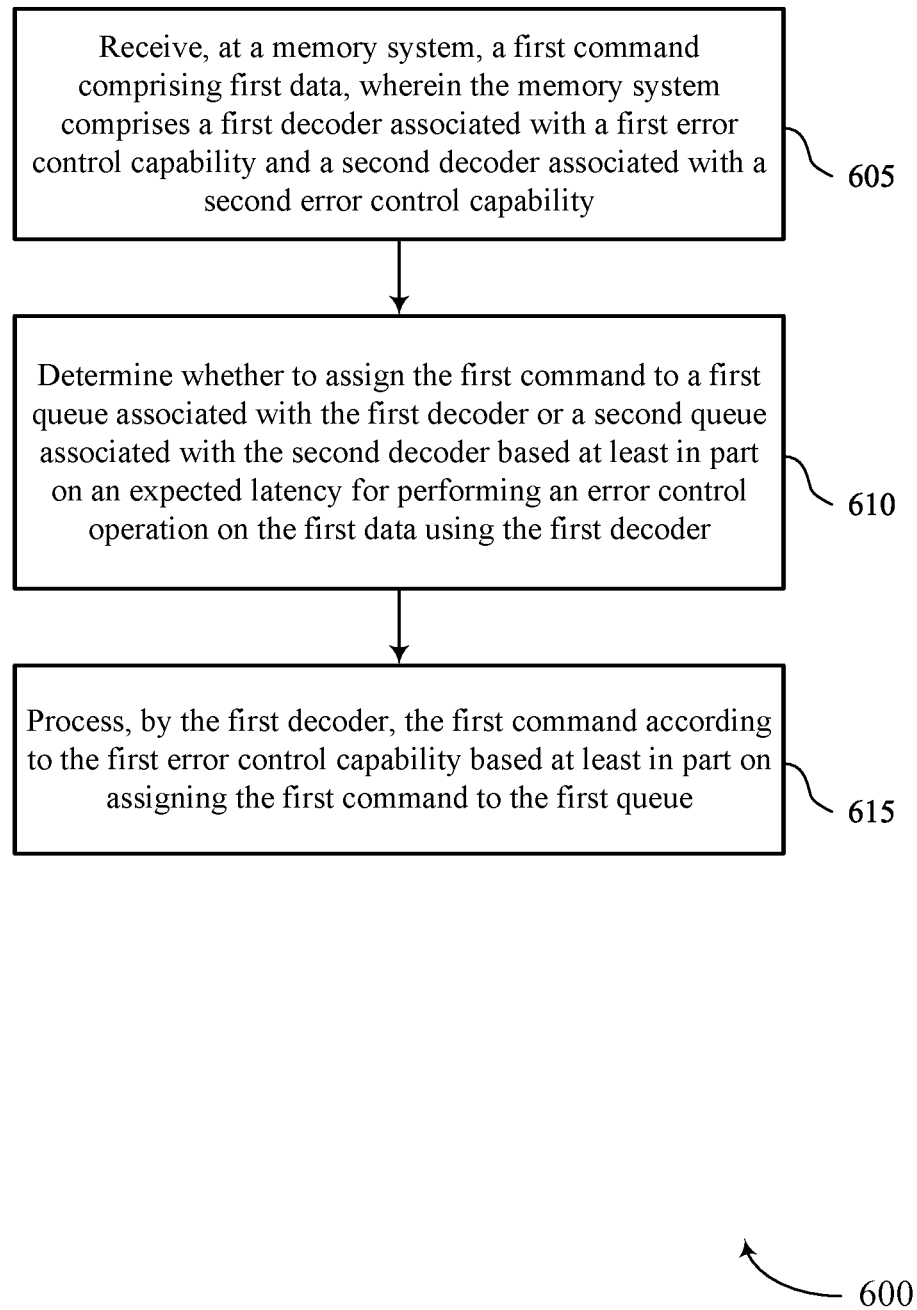
FIG. 6 shows a flowchart illustrating a method or methods that support queue management for a memory system in accordance with examples as disclosed herein.

FIG. 6 shows a flowchart illustrating a method 600 that supports queue management for a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at a memory system, a first command including first data, where the memory system includes a first decoder associated with a first error control capability and a second decoder associated with a second error control capability. The operations of 605 may be performed in accordance with examples as disclosed herein. In some examples, aspects of the operations of 605 may be performed by a command reception component 525 as described with reference to FIG. 5.

At 610, the method may include determining whether to assign the first command to a first queue associated with the first decoder or a second queue associated with the second decoder based at least in part on an expected latency for performing an error control operation on the first data using the first decoder. The operations of 610 may be performed in accordance with examples as disclosed herein. In some examples, aspects of the operations of 610 may be performed by a command assignment component 530 as described with reference to FIG. 5.

At 615, the method may include processing, by the first decoder, the first command according to the first error control capability based at least in part on assigning the first command to the first queue. The operations of 615 may be performed in accordance with examples as disclosed herein. In some examples, aspects of the operations of 615 may be performed by a command processing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a first command including first data, where the memory system includes a first decoder associated with a first error control capability and a second decoder associated with a second error control capability; determining whether to assign the first command to a first queue associated with the first decoder or a second queue associated with the second decoder based at least in part on an expected latency for performing an error control operation on the first data using the first decoder; and processing, by the first decoder, the first command according to the first error control capability based at least in part on assigning the first command to the first queue.

Aspect 2: The method, apparatus, or non-transitory computer-readable medium of aspect 1, further including operations, features, circuitry, logic, means, or instructions, or any combination thereof for identifying the expected latency for performing the error control operation on the first data using the first decoder based at least in part on receiving the first command, where determining whether to assign the first command to the first queue or the second queue is based at least in part on identifying the expected latency.

Aspect 3: The method, apparatus, or non-transitory computer-readable medium of aspect 2 where identifying the expected latency for performing the error control operation on the first data includes operations, features, circuitry, logic, means, or instructions, or any combination thereof for identifying a type of the first data, where determining whether to assign the first command to the first queue associated with the first decoder or the second queue associated with the second decoder is based at least in part on the type of the first data.

Aspect 4: The method, apparatus, or non-transitory computer-readable medium of any of aspects 2 through 3, further including operations, features, circuitry, logic, means, or instructions, or any combination thereof for identifying a value of at least one bit of the first data indicated by a host device, where identifying the expected latency for performing the error control operation on the first data is based at least in part on identifying the value.

Aspect 5: The method, apparatus, or non-transitory computer-readable medium of any of aspects 1 through 4, further including operations, features, circuitry, logic, means, or instructions, or any combination thereof for receiving, at the memory system, a second command including second data, where the second command includes an indication of a priority level for processing the second command; assigning the second command to the first queue associated with the first decoder based at least in part on the indication of the priority level for processing the second command; and processing, by the first decoder, the second command according to the first error control capability based at least in part on assigning the second command to the first queue.

Aspect 6: The method, apparatus, or non-transitory computer-readable medium of any of aspects 1 through 5, further including operations, features, circuitry, logic, means, or instructions, or any combination thereof for assigning the first command to the first queue associated with the first decoder based at least in part on the expected latency for performing the error control operation on the first data satisfying a first threshold value.

Aspect 7: The method, apparatus, or non-transitory computer-readable medium of any of aspects 1 through 6, further including operations, features, circuitry, logic, means, or instructions, or any combination thereof for identifying a second expected latency for performing an error control operation on third data associated with a third command and processing, by the second decoder, the third command according to the second error control capability based at least in part on the second expected latency for performing the error control operation on the third data associated with the third command.

Aspect 8: The method, apparatus, or non-transitory computer-readable medium of aspect 7, further including operations, features, circuitry, logic, means, or instructions, or any combination thereof for receiving, at the memory system, the third command including the third data, where identifying the second expected latency for performing the error control operation on the third data is based at least in part on receiving the third command; determining whether to assign the third command to the second queue associated with the second decoder based at least in part on identifying the second expected latency for performing the error control operation on the third data; and assigning the third command to the second queue associated with the second decoder based at least in part on the second expected latency for performing the error control operation on the third data satisfying a second threshold value, where processing the third data is based at least in part on assigning the third command to the second queue.

Aspect 9: The method, apparatus, or non-transitory computer-readable medium of any of aspects 1 through 8, further including operations, features, circuitry, logic, means, or instructions, or any combination thereof for identifying a third expected latency for performing an error control operation on fourth data associated with a fourth command and attempting to process, by the second decoder for a duration, the fourth command according to the second error control capability based at least in part on the third expected latency for performing the error control operation on the fourth data associated with the fourth command.

Aspect 10: The method, apparatus, or non-transitory computer-readable medium of aspect 9, further including operations, features, circuitry, logic, means, or instructions, or any combination thereof for determining, after the duration, that the fourth command was unsuccessfully processed by the second decoder; transferring the fourth data to the first queue based at least in part on determining that the fourth command was unsuccessfully processed; and processing, by the first decoder, the fourth command according to the first error control capability based at least in part on transferring the fourth data to the first queue.

Aspect 11: The method, apparatus, or non-transitory computer-readable medium of any of aspects 9 through 10, further including operations, features, circuitry, logic, means, or instructions, or any combination thereof for determining, after the duration, that the fourth command was unsuccessfully processed and refraining from processing the fourth command according to the second error control capability based at least in part on determining that the fourth command was unsuccessfully processed.

Aspect 12: The method, apparatus, or non-transitory computer-readable medium of any of aspects 1 through 11 where the first error control capability of the first decoder includes a first quantity of errors that are detectable and a second quantity of errors that are correctable by the first decoder; the second error control capability of the second decoder includes a third quantity of errors that are detectable and a fourth quantity of errors that are correctable by the second decoder; and the first quantity of errors being greater than the third quantity of errors.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a controller associated with a memory system, wherein the controller is configured to cause the apparatus to:
        receive, at the memory system, a first command comprising first data, wherein the memory system comprises a first decoder associated with a first error control capability and a second decoder associated with a second error control capability;
        determine whether to assign the first command to a first queue associated with the first decoder or a second queue associated with the second decoder based at least in part on an expected latency for performing an error control operation on the first data using the first decoder; and
        process, by the first decoder, the first command according to the first error control capability based at least in part on assigning the first command to the first queue.

2. The apparatus of claim 1, wherein the controller is further configured to cause the apparatus to:
    identify the expected latency for performing the error control operation on the first data using the first decoder based at least in part on receiving the first command, wherein determining whether to assign the first command to the first queue or the second queue is based at least in part on identifying the expected latency.

3. The apparatus of claim 2, wherein identifying the expected latency for performing the error control operation on the first data is configured to cause the apparatus to:
    identify a type of the first data, wherein determining whether to assign the first command to the first queue associated with the first decoder or the second queue associated with the second decoder is based at least in part on the type of the first data.

4. The apparatus of claim 2, wherein the controller is further configured to cause the apparatus to:
   identify a value of at least one bit of the first data indicated by a host device, wherein identifying the expected latency for performing the error control operation on the first data is based at least in part on identifying the value.

5. The apparatus of claim 1, wherein the controller is further configured to cause the apparatus to:
   receive, at the memory system, a second command comprising second data, wherein the second command comprises an indication of a priority level for processing the second command;
   assign the second command to the first queue associated with the first decoder based at least in part on the indication of the priority level for processing the second command; and
   process, by the first decoder, the second command according to the first error control capability based at least in part on assigning the second command to the first queue.

6. The apparatus of claim 1, wherein the controller is further configured to cause the apparatus to:
   assign the first command to the first queue associated with the first decoder based at least in part on the expected latency for performing the error control operation on the first data satisfying a first threshold value.

7. The apparatus of claim 1, wherein the controller is further configured to cause the apparatus to:
   identify a second expected latency for performing the error control operation on third data associated with a third command; and
   process, by the second decoder, the third command according to the second error control capability based at least in part on the second expected latency for performing the error control operation on the third data associated with the third command.

8. The apparatus of claim 7, wherein the controller is further configured to cause the apparatus to:
   receive, at the memory system, the third command comprising the third data, wherein identifying the second expected latency for performing the error control operation on the third data is based at least in part on receiving the third command;
   determine whether to assign the third command to the second queue associated with the second decoder based at least in part on identifying the second expected latency for performing the error control operation on the third data; and
   assign the third command to the second queue associated with the second decoder based at least in part on the second expected latency for performing the error control operation on the third data satisfying a second threshold value, wherein processing the third data is based at least in part on assigning the third command to the second queue.

9. The apparatus of claim 1, wherein the controller is further configured to cause the apparatus to:
   identify a third expected latency for performing the error control operation on fourth data associated with a fourth command; and
   attempt to process, by the second decoder for a duration, the fourth command according to the second error control capability based at least in part on the third expected latency for performing the error control operation on the fourth data associated with the fourth command.

10. The apparatus of claim 9, wherein the controller is further configured to cause the apparatus to:
    determine, after the duration, that the fourth command was unsuccessfully processed by the second decoder;
    transfer the fourth data to the first queue based at least in part on determining that the fourth command was unsuccessfully processed; and
    process, by the first decoder, the fourth command according to the first error control capability based at least in part on transferring the fourth data to the first queue.

11. The apparatus of claim 9, wherein the controller is further configured to cause the apparatus to:
    determine, after the duration, that the fourth command was unsuccessfully processed; and
    refrain from processing the fourth command according to the second error control capability based at least in part on determining that the fourth command was unsuccessfully processed.

12. The apparatus of claim 1, wherein:
    the first error control capability of the first decoder comprises a first quantity of errors that are detectable and a second quantity of errors that are correctable by the first decoder;
    the second error control capability of the second decoder comprises a third quantity of errors that are detectable and a fourth quantity of errors that are correctable by the second decoder; and
    the first quantity of errors being greater than the third quantity of errors.

13. A non-transitory computer-readable medium storing code, the code comprising instructions executable by a processor to:
    receive, at a memory system, a first command comprising first data, wherein the memory system comprises a first decoder associated with a first error control capability and a second decoder associated with a second error control capability;
    determine whether to assign the first command to a first queue associated with the first decoder or a second queue associated with the second decoder based at least in part on an expected latency for performing an error control operation on the first data using the first decoder; and
    process, by the first decoder, the first command according to the first error control capability based at least in part on assigning the first command to the first queue.

14. The non-transitory computer-readable medium of claim 13, wherein the instructions are further executable by the processor to:
    identify the expected latency for performing the error control operation on the first data using the first decoder based at least in part on receiving the first command, wherein determining whether to assign the first command to the first queue or the second queue is based at least in part on identifying the expected latency.

15. The non-transitory computer-readable medium of claim 14, wherein the instructions to identify the expected latency for performing the error control operation on the first data are executable by the processor to:
    identify a type of the first data, wherein determining whether to assign the first command to the first queue associated with the first decoder or the second queue associated with the second decoder is based at least in part on the type of the first data.

16. The non-transitory computer-readable medium of claim 14, wherein the instructions are further executable by the processor to:

identify a value of at least one bit of the first data indicated by a host device, wherein identifying the expected latency for performing the error control operation on the first data is based at least in part on identifying the value.

17. The non-transitory computer-readable medium of claim 13, wherein the instructions are further executable by the processor to:
receive, at the memory system, a second command comprising second data, wherein the second command comprises an indication of a priority level for processing the second command;
assign the second command to the first queue associated with the first decoder based at least in part on the indication of the priority level for processing the second command; and
process, by the first decoder, the second command according to the first error control capability based at least in part on assigning the second command to the first queue.

18. The non-transitory computer-readable medium of claim 13, wherein the instructions are further executable by the processor to:
assign the first command to the first queue associated with the first decoder based at least in part on the expected latency for performing the error control operation on the first data satisfying a first threshold value.

19. The non-transitory computer-readable medium of claim 13, wherein the instructions are further executable by the processor to:
identify a second expected latency for performing the error control operation on third data associated with a third command; and
process, by the second decoder, the third command according to the second error control capability based at least in part on the second expected latency for performing the error control operation on the third data associated with the third command.

20. The non-transitory computer-readable medium of claim 19, wherein the instructions are further executable by the processor to:
receive, at the memory system, the third command comprising the third data, wherein identifying the second expected latency for performing the error control operation on the third data is based at least in part on receiving the third command;
determine whether to assign the third command to the second queue associated with the second decoder based at least in part on identifying the second expected latency for performing the error control operation on the third data; and
assign the third command to the second queue associated with the second decoder based at least in part on the second expected latency for performing the error control operation on the third data satisfying a second threshold value, wherein processing the third data is based at least in part on assigning the third command to the second queue.

21. The non-transitory computer-readable medium of claim 13, wherein the instructions are further executable by the processor to:
identify a third expected latency for performing the error control operation on fourth data associated with a fourth command; and
attempt to process, by the second decoder for a duration, the fourth command according to the second error control capability based at least in part on the third expected latency for performing the error control operation on the fourth data associated with the fourth command.

22. The non-transitory computer-readable medium of claim 21, wherein the instructions are further executable by the processor to:
determine, after the duration, that the fourth command was unsuccessfully processed by the second decoder;
transfer the fourth data to the first queue based at least in part on determining that the fourth command was unsuccessfully processed; and
process, by the first decoder, the fourth command according to the first error control capability based at least in part on transferring the fourth data to the first queue.

23. The non-transitory computer-readable medium of claim 21, wherein the instructions are further executable by the processor to:
determine, after the duration, that the fourth command was unsuccessfully processed; and
refrain from processing the fourth command according to the second error control capability based at least in part on determining that the fourth command was unsuccessfully processed.

24. The non-transitory computer-readable medium of claim 13, wherein:
the first error control capability of the first decoder comprises a first quantity of errors that are detectable and a second quantity of errors that are correctable by the first decoder;
the second error control capability of the second decoder comprises a third quantity of errors that are detectable and a fourth quantity of errors that are correctable by the second decoder; and
the first quantity of errors being greater than the third quantity of errors.

25. A method, comprising:
receiving, at a memory system, a first command comprising first data, wherein the memory system comprises a first decoder associated with a first error control capability and a second decoder associated with a second error control capability;
determining whether to assign the first command to a first queue associated with the first decoder or a second queue associated with the second decoder based at least in part on an expected latency for performing an error control operation on the first data using the first decoder; and
processing, by the first decoder, the first command according to the first error control capability based at least in part on assigning the first command to the first queue.

* * * * *